US012741866B2

(12) United States Patent
Otsuki et al.

(10) Patent No.: US 12,741,866 B2

(45) **Date of Patent: *Sep. 22, 2026**

(54) HYDROGEN STORAGE MATERIAL, HYDROGEN STORAGE CONTAINER, AND HYDROGEN SUPPLY APPARATUS

(71) Applicant: SANTOKU CORPORATION, Kobe (JP)

(72) Inventors: Takayuki Otsuki, Kobe (JP); Masakazu Nishimoto, Kobe (JP); Yasuhiko Kawaguchi, Kobe (JP)

(73) Assignee: SANTOKU CORPORATION, Kobe (JP)

(*) Notice: Subject to any disclaimer, the term of this patent is extended or adjusted under 35 U.S.C. 154(b) by 430 days.

This patent is subject to a terminal disclaimer.

(21) Appl. No.: 18/287,925

(22) PCT Filed: Apr. 25, 2022

(86) PCT No.: PCT/JP2022/018750

§ 371 (c)(1), (2) Date: Oct. 23, 2023

(87) PCT Pub. No.: WO2022/230817

PCT Pub. Date: Nov. 3, 2022

(65) Prior Publication Data

US 2024/0208807 A1 Jun. 27, 2024

(30) Foreign Application Priority Data

Apr. 26, 2021 (JP) ................................ 2021-073738

(51) Int. Cl.

| | |
|---|---|
| ***C01B 3/00*** | (2026.01) |
| ***C01B 3/0047*** | (2026.01) |
| ***C22C 19/00*** | (2006.01) |

(52) U.S. Cl.

CPC .......... *C01B 3/0057* (2013.01); *C22C 19/007* (2013.01); *C22C 2202/04* (2013.01)

(58) Field of Classification Search

CPC ..... C22C 19/007; C22C 2202/04; C22F 1/10; C01B 3/0057

See application file for complete search history.

(56) References Cited

U.S. PATENT DOCUMENTS

| | | | |
|---|---|---|---|
| 4,744,946 A | 5/1988 | Sasai et al. | |
| 5,496,424 A | 3/1996 | Fujitani et al. | |
| 6,106,769 A | 8/2000 | Shinya et al. | |
| 12,590,355 B2 * | 3/2026 | Otsuki | C22C 19/007 |
| 2009/0061318 A1 | 3/2009 | Ishida et al. | |
| 2022/0006070 A1 | 1/2022 | Ouyang et al. | |

FOREIGN PATENT DOCUMENTS

| | | |
|---|---|---|
| CN | 103103380 A | 5/2013 |
| EP | 0751229 A1 | 1/1997 |
| EP | 4 209 608 A1 | 7/2023 |
| JP | 60-070154 A | 4/1985 |
| JP | 63-047345 A | 2/1988 |
| JP | 06-116665 A | 4/1994 |
| JP | H10-183280 A | 7/1998 |
| JP | 2009-074164 A | 4/2009 |
| WO | 2020/107832 A1 | 6/2020 |
| WO | 2022/050268 A1 | 3/2022 |

OTHER PUBLICATIONS

Cao, Zhijie, et al. "Enhanced discharge capacity and cycling properties in high-samarium, praseodymium/neodymium-free, and low-cobalt A2B7 electrode materials for nickel-metal hydride battery." International Journal of Hydrogen Energy 40.1 (2015): 451-455.*

Cheng Tan, et al., "Effect of Sm on performance of Pr/Nd/Mg-free and low-cobalt AB4.6 alloys in nickel-metal hydride battery electrode", Journal of Alloys and Compounds, 2020, 10 pages, vol. 829, 154530.

International Search Report of PCT/JP2022/018750 dated Jul. 5, 2022 [PCT/ISA/210].

Mungole et al., "Correlation between microstructure and hydrogen storage capacity in $MmNi_5$ alloys with Al, Mn and Sn substitutions", International Journal of Hydrogen Energy, vol. 24, 1999, pp. 467-471.

Extended European Search Report issued Mar. 24, 2025 in Application No. 22795730.5.

Chinese Office Action issued Apr. 29, 2026 in Patent Application No. 202280029481.1.

* cited by examiner

*Primary Examiner* — Jessee R Roe

(74) *Attorney, Agent, or Firm* — Sughrue Mion, PLLC

(57) ABSTRACT

Provided are hydrogen storage materials having hydrogen absorption (storage) desorption properties suitable for hydrogen storage in a temperature range of 0° C. or lower. Also provided are a hydrogen storage container containing the hydrogen storage materials, and a hydrogen supply apparatus including the hydrogen storage container. The hydrogen storage materials have an alloy with an elemental composition represented by Formula (1):

Formula 1

$$La_aCe_bSm_cNi_dM_e$$

in Formula (1), M is at least one kind selected from Mn, Co, and Al and essentially contains Mn, a satisfies 0.00≤a≤0.62, b satisfies 0.20≤b≤0.57, c satisfies 0.17≤c≤0.60, d satisfies 4.50≤d≤5.20, e satisfies 0.15≤e≤0.70, a+b+c=1, c+e satisfies 0.55≤c+e≤1.20, and d+e satisfies 5.13≤d+e≤5.40.

16 Claims, 2 Drawing Sheets

PCT curve (-20°C)
Example 1
Comparative Example 1
Equilibrium pressure (MPa)
10.00
1.00
0.10
0.01
0.00
0.10
0.20
0.30
0.40
0.50
0.60
0.70
0.80
0.90
1.00
1.10
1.20
1.30
1.40
1.50
Absorption amount (wt%)

PCT curve (-20°C)
Example 1
Comparative Example 3
Equilibrium pressure (MPa)
10.00
1.00
0.10
0.01
Absorption amount (wt%)
0.00
0.10
0.20
0.30
0.40
0.50
0.60
0.70
0.80
0.90
1.00
1.10
1.20
1.30
1.40
1.50

HYDROGEN STORAGE MATERIAL, HYDROGEN STORAGE CONTAINER, AND HYDROGEN SUPPLY APPARATUS

CROSS REFERENCE TO RELATED APPLICATIONS

This application is a National Stage of International Application No. PCT/JP2022/018750 filed on Apr. 25, 2022, claiming priority based on Japanese Patent Application No. 2021-073738 filed on Apr. 26, 2021.

TECHNICAL FIELD

The present invention relates to a hydrogen storage material, a hydrogen storage container, and a hydrogen supply apparatus.

BACKGROUND ART

Hydrogen absorbing (storage) alloys are alloys capable of reversibly absorbing and desorbing hydrogen and have already been used as negative electrode materials for nickel hydrogen secondary batteries. Recently, the hydrogen storage alloys have been expected as materials that can safely store hydrogen which has been attracted attention as an energy source, and various researches are also ongoing for utilization of hydrogen storage and supply systems with hydrogen storage materials. Various types of the hydrogen storage alloys are reported such as the AB5-type, the AB2-type, the TiFe-type, and the BCC-type such as TiVCr. Among these alloys, the AB5-type alloys are known for easiness of initial activation and relatively favorable flatness of plateau in hydrogen pressure-composition isotherm (PCT curve), and thus have been studied for practical realization as the hydrogen storage material.

The use environment of hydrogen storage materials is expected to become increasingly diverse in the future. Currently, general hydrogen storage tanks store hydrogen in the vicinity of normal temperature, and are used at a hydrogen desorption pressure of 10 atm or less while raising the temperature up to about a maximum of 100° C. when using hydrogen, but in the future, it is expected to be used in low-temperature regions of 0° C. or lower, such as boil-off gas recovery of liquefied hydrogen and hydrogen storage in cold area, and the like, or in applications that require high desorption pressure of 10 atm or more at normal temperature (for example, hydrogen compressor applications). However, there are few reports of a hydrogen storage alloys operating in such an environment. Moreover, there are very few alloys that are favorably initial activation and at the same time satisfy requirements such as high hydrogen absorption amount, favorable plateau flatness, and hysteresis.

Patent Literature 1 discloses (1) hydrogen storage materials, including an alloy represented by a general formula $LmNi_{a-x}A_x$ (in the formula, Lm is a rare earth metal containing 40 to 70% La, 0.1 to 2.0% Ce, and other metals such as Nd, Pr, and Sm; A is one kind of metal selected from the group consisting of Al, Mn, Fe, and Cr; a satisfies 4.8<a<5.5; and x=0.01 to 2.0), and (2) hydrogen storage materials, including an alloy represented by a general formula $LmNi_{a-x}A_yB_z$ (in the formula, Lm is a rare earth metal containing 40 to 70% La, 0.1 to 20% Ce, and other metals such as Nd, Pr, and Sm; A is one kind of metal selected from the group consisting of Al, Mn, and Fe; B is one kind of metal selected from the group consisting of Mn (except when A is Mn), Co, Zr, and V; a satisfies 4.8<a<5.5; x=y+z; and y, z=0.01 to 2.0). Patent Literature 1 also discloses that with the above constitution, hydrogen storage materials those are easily activated at normal temperature, with large hydrogen absorption amount, high rate of absorption and desorption, small hysteresis, and flatness of plateau.

Patent Literature 2 discloses hydrogen storage materials characterized by including one kind of Al or Sn and Co, represented by a general formula $R \cdot Ni_{5-(a+b+c)} \cdot A_a \cdot B_b \cdot Co_c$ (where R is a rare earth metal or a mixture of a rare earth metal; A is one kind of Mn, Fe, and Cr; B is one kind of Al and Sn; and a, b, and c are each 0.01 to 1.0), and (2) a hydrogen storage material characterized by including one kind of Al or Sn and Co, represented by a general formula $R \cdot Ni_{5-(a+b+c+d)} \cdot A_a \cdot B_b \cdot C_c \cdot Co_d$ (where R is a rare earth metal or a mixture of a rare earth metal; A and B are each one kind of metal of Mn, Fe, and Cr and different from each other; C is one kind of Al and Sn; and a, b, c, and d are each 0.01 to 1.0). Patent Literature 2 also discloses that by adding Co and Al or Sn together with one kind or two kinds of Mn, Fe, and Cr to a R—Ni-type alloy, the absorption amount is increased, and the hysteresis is reduced.

CITATION LIST

Patent Literature

Patent Literature 1: JP S60-70154 A
Patent Literature 2: JP S63-47345 A

SUMMARY OF INVENTION

Technical Problem

Both of Patent Literatures 1 and 2 have tried to improve various properties by adding elements, but the expected use environment is about 0° C. to 100° C., and it is considered that new technical development is necessary for use in a low temperature environment of 0° C. or lower.

Thus, an object of the present invention is to provide hydrogen storage materials having hydrogen absorption (storage) and desorption properties suitable for hydrogen storage in a low temperature environment of 0° C. or lower. Specifically, an object of the present invention is to provide hydrogen storage materials with large hydrogen storage capacity and large hydrogen desorption capacity, which could be operated under a temperature range of −20° C., and has small hysteresis between absorption PCT curve and desorption PCT curve. Furthermore, an object of the present invention is to provide a hydrogen storage container containing hydrogen storage materials having suitable properties for hydrogen storage in a low temperature environment of 0° C. or lower, and hydrogen supply apparatuses including the hydrogen storage containers.

Solution to Problem

As a result of conducting diligent studies in order to solve the above problems, the present inventors have found that alloys having composition containing specific rare earth elements and transition metal elements based on $LaNi_5$ have a sufficient hydrogen storage and desorption capacity at −20° C. and small hysteresis, and further shows clear squareness in the PCT curve, so that the amount of hydrogen that can be desorbed is large and the hydrogen can be desorbed with almost no pressure fluctuation until the end of desorption, and thus have completed the present invention.

That is, according to the present invention, hydrogen storage materials comprising alloys having elemental composition represented by the following Formula (1) is provided.

[Chem. 1]

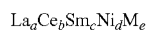

(1)

[in Formula (1), M is at least one kind selected from Mn, Co, and Al and essentially contains Mn, a satisfies $0.00 \leq a \leq 0.62$, b satisfies $0.20 \leq b \leq 0.57$, c satisfies $0.17 \leq c \leq 0.60$, d satisfies $4.50 \leq d \leq 5.20$, e satisfies $0.15 \leq e \leq 0.70$, $a+b+c=1$, c+e satisfies $0.55 \leq c+e \leq 1.20$, and d+e satisfies $5.13 \leq d+e \leq 5.40$.]

According to the invention of another aspect of the present invention, provided are a hydrogen storage container containing the above hydrogen storage materials and hydrogen supply apparatuses including the hydrogen storage containers.

Advantageous Effects of Invention

Since the hydrogen storage materials of the present invention comprise alloys having the above-described specific elemental composition, the materials have excellent hydrogen absorption and desorption properties at 0° C. or lower and can be suitably used for hydrogen storage.

DESCRIPTION OF EMBODIMENTS

Figure 1:
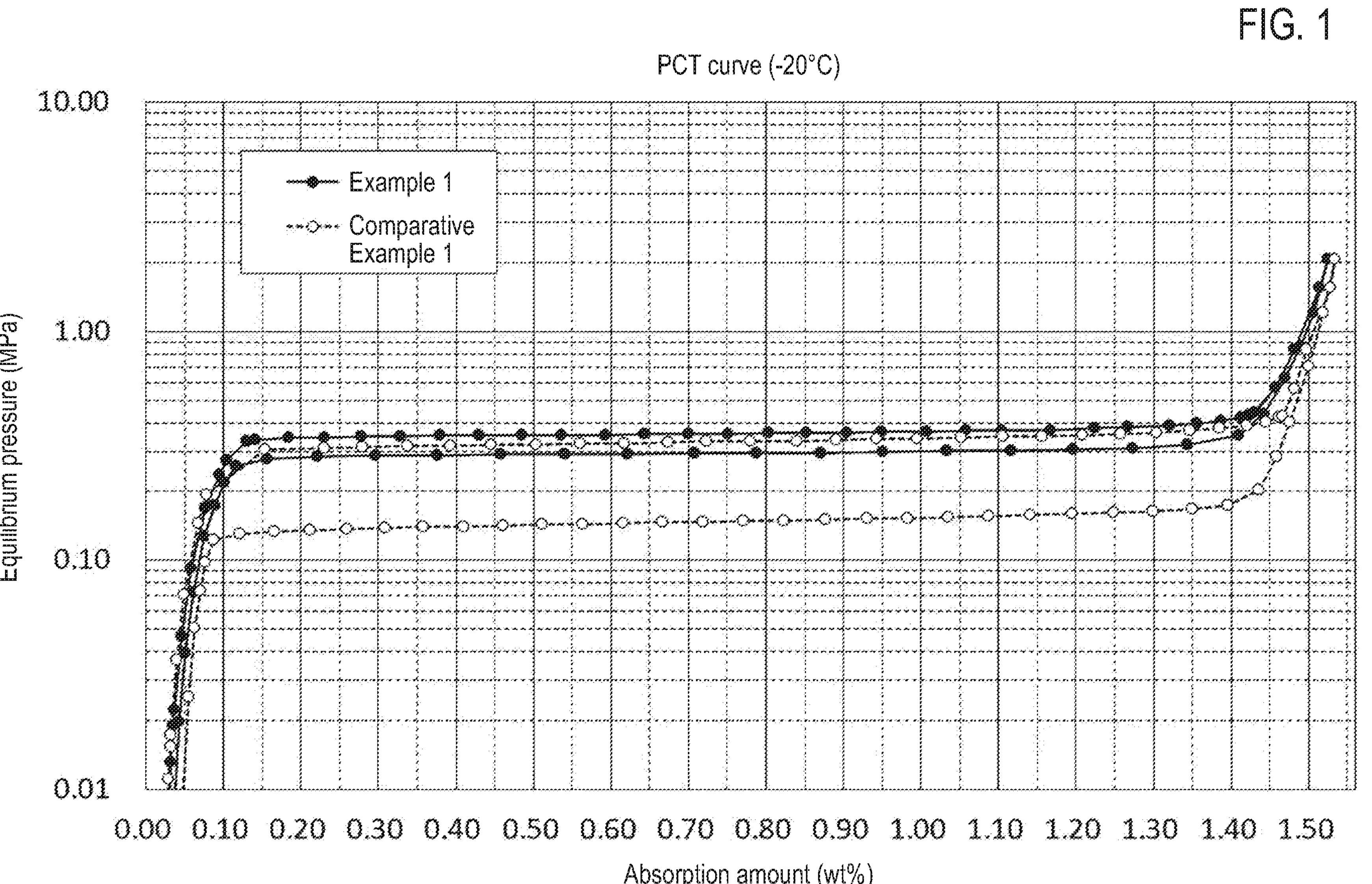
FIG. 1 shows hydrogen pressure-composition isotherms (PCT curves) of the alloy powder in Example 1 and the alloy powder in Comparative Example 1, measured at −20° C. The y-axis indicates the hydrogen absorption pressure during hydrogen absorption and the hydrogen desorption pressure during hydrogen desorption.

Hereinafter, the present invention will be described in detail. The hydrogen storage materials of the present invention are materials comprising alloys having elemental composition represented by the following Formula (1). The hydrogen storage materials are preferably materials consisting of the alloys of the present invention. Hereinafter, the alloy having elemental composition represented by Formula (1) may also be referred to as an alloy or alloys of the present invention.

[Chem. 2]

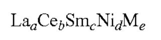

(1)

[in Formula (1), M is at least one kind selected from Mn, Co, and Al and essentially contains Mn, a satisfies $0.00 \leq a \leq 0.62$, b satisfies $0.20 \leq b \leq 0.57$, c satisfies $0.17 \leq c \leq 0.60$, d satisfies $4.50 \leq d \leq 5.20$, e satisfies $0.15 \leq e \leq 0.70$, $a+b+c=1$, c+e satisfies $0.55 \leq c+e \leq 1.20$, and d+e satisfies $5.13 \leq d+e \leq 5.40$.]

In Formula (1), a, b, c, d, and e, represent content of the respective elements by atomic ratio, and detailed description thereof is as follows. Hereinafter, the content ratio may be referred to as a "content" or an "amount".

La is effective in increasing the hydrogen absorption amount of invented alloys, and a, which represents the content of La in Formula (1), satisfies $0.00 \leq a \leq 0.62$. The lower limit of a is preferably $0.01 \leq a$, and more preferably $0.02 \leq a$. The upper limit of a is preferably $a \leq 0.40$. In a case that a is larger than the upper limit, the hydrogen equilibrium pressure may be too reduced.

Ce is effective in raising the hydrogen equilibrium pressure of invented alloys, and b, which represents the content of Ce in Formula (1), satisfies $0.20 \leq b \leq 0.57$. The lower limit of b is preferably $0.22 \leq b$. In a case that b is larger than the upper limit, the hysteresis of the PCT curve may be worsen.

Sm is effective in raising the hydrogen equilibrium pressure and is also effective in improving of squareness in the PCT curve of invented alloys. c, which represents the content of Sm in Formula (1), satisfies $0.17 \leq c \leq 0.60$. The lower limit of c is preferably $0.20 \leq c$ and more preferably $0.22 \leq c$ and particularly preferably $0.24 \leq c$. The upper limit of c is preferably $c \leq 0.55$. In a case that c is smaller than the lower limit, the effect of raising the hydrogen equilibrium pressure may not be enough and the effect of improvement of squareness in the PCT curve may not be attained, and in a case that c is larger than the upper limit, the hydrogen absorption amount may be reduced. In this regard, the squareness refers to the squareness between plateau region and steep pressure dropping region toward end of desorption for desorption PCT curve, thus, improvement of squareness of materials could be regarded as increasing their available hydrogen capacity. The index of this squareness in the present application will be described later.

Ni is effective in improving the durability of the hydrogen storage alloys according to the present invention and reducing the hysteresis, and d, which represents the content of Ni in Formula (1), satisfies $4.50 \leq d \leq 5.20$. The lower limit of d is preferably $4.55 \leq d$, and the upper limit of d is preferably $d \leq 5.15$. In a case that d is smaller than the lower limit, the effect of improving the durability and the effect of reducing the hysteresis may not be enough, and in a case that d is larger than the upper limit, the hydrogen absorption amount may be reduced.

M is at least one kind selected from Mn, Co, and Al and essentially contains Mn, and is effective in reducing the hysteresis of the PCT curve of invented alloys. e, which represents the content of M in Formula (1), satisfies $0.15 \leq e \leq 0.70$. The lower limit of e is preferably $0.17 \leq e$. In a case that e is smaller than the lower limit, the effect of reducing the hysteresis of the PCT curve may not be enough, and in a case that e is higher than the upper limit, the hydrogen equilibrium pressure may be too low, and the reaction speed of hydrogen absorption and desorption may be worsened.

d+e in Formula (1) represents the sum of the contents of Ni and M. The value of d+e affects the hysteresis of the PCT curve and the hydrogen storage amount of the materials of the present invention, and by adjusting the value of d+e to be within the following range, alloys, which have small hysteresis of the PCT curves while maintaining the sufficient hydrogen storage capacity, can be obtained. d+e satisfies $5.13 \leq d+e \leq 5.40$, and the lower limit of d+e is preferably $5.15 \leq d+e$.

As described above, both Sm and M in Formula (1) are elements effective in raising the equilibrium pressure during hydrogen absorption or desorption, improving the squareness in the PCT curve, and reducing the hysteresis of the PCT curve of invented alloys, in addition, these effects can be enhanced when both elements are applied simultaneously in Formula (1). In Formula (1), c+e satisfies $0.55 \leq c+e \leq 1.20$, and preferably $0.57 \leq c+e \leq 1.17$.

The elemental composition of the alloys of the present invention can be confirmed by quantitative analysis using an Inductively Coupled Plasma (ICP) analysis apparatus. In the present specification, unless specified otherwise, the alloys of the present invention refer to the alloys having the elemental composition in accordance with by Formula (1).

The alloys of the present invention may contain inevitable impurities derived from raw materials and the like. Examples of the inevitable impurities include, but are not limited to, Pr, and Nd. The acceptable amount of inevitable impurities in the alloys of the present invention is 0.5 mass % or less.

The alloys of the present invention can be obtained as alloy flakes or other shapes as described later. The average grain size of crystal in the alloy flake or slab is preferably 25 to 250 μm and more preferably 40 to 230 μm. The average grain size of crystal can be measured as follows. The alloy flake or slab is embedded in a normal temperature curable-type resin (for example, epoxy resin), the resin is cured, embedded alloy is subjected to being cut and precision polishing using a wet polishing machine, and finally the polished cross-section with mirror-like surface is obtained. Next, for example, the cross section of the alloy is etched with a 0.1 M nitric acid aqueous solution, then a polarization microscope is used to measure the lengths of the major axial diameter and the minor axial diameter of each grain, and the grain size of the crystal is defined as "(length of the major axial diameter+length of the minor axial diameter)/2". The grain size is measured in this way, and the average of three grain size per alloy flake or slab is taken as the average grain size. The size of the alloy flake or slab for measuring the crystal grain size is not particularly limited. For example, an alloy slab of about 1 $cm^3$ may be used. Further, the grain size may be measured by using an alloy flake of about 1 $cm^2$, and even in that case, the average grain size is preferably 25 to 250 μm.

It is preferable that, in the hydrogen pressure-composition isotherm (PCT curve) for the alloys of the present invention at −20° C., a hydrogen desorption pressure $P_{a1}$ at 0.3 wt % $H_2$ and a hydrogen desorption pressure Paz at 0.1 wt % $H_2$ satisfy a relational expression of $[\{\ln(P_{a1})-\ln(P_{a2})\}/0.2] \leq 4.20$. Since the PCT curve has the above features, the squareness of the curve becomes clearer, which indicates that more hydrogen can be desorbed when hydrogen desorption is terminated at a predetermined pressure, and thus, these alloys are very suitable hydrogen storage materials that can be utilized without leaving stored hydrogen. It is more preferable that $P_{a1}$ and $P_{a2}$ satisfy the relationship of $[\{\ln(P_{a1})-\ln(P_{a2})\}/0.2] \leq 2.00$. In addition, the results of the above expression are regarded as the index of "squareness" of PCT curves for hydrogen desorption. In order to obtain $P_{a2}$, it is preferable to measure two or more hydrogen desorption pressures between 0.08 wt % $H_2$ to 0.12 wt % $H_2$.

The alloys of the present invention satisfy preferably the relationship of $[\{\ln(P_{a3})-\ln(P_{a1})\}/0.8] \leq 0.50$, and more preferably the relationship of $[\{\ln(P_{a3})-\ln(P_{a1})\}/0.8] \leq 0.28$. In which, $P_{a1}$ and Pas are hydrogen desorption pressure at 0.3 wt % $H_2$ and hydrogen desorption pressure at 1.1 wt % $H_2$ in the PCT curve at −20° C., respectively. This is because when the above relationship is satisfied, the required hydrogen pressure is easily maintained, and the available amount of hydrogen can be secured as much as possible at the hydrogen supply destination, which are advantageous. In addition, the relationship of the above expression is used as the index of "plateau flatness for hydrogen desorption curves".

Further, it is preferable that, invented alloys satisfy the relationship of $\ln(P_{b1})/\ln(P_{b2}) \leq 0.60$, in which, $P_{b1}$ and $P_{b2}$ are hydrogen absorption pressure and hydrogen desorption pressure at 0.8 wt % $H_2$ in the PCT curves at −20° C., respectively. Since the alloy satisfying the above expression exhibits a small hysteresis in the PCT curve, there is no need to generate a large pressure difference or temperature difference between absorption and desorption of hydrogen, and efficient operation is possible. In addition, the relationship of the above expression is used as the index of "hysteresis of the PCT curve".

Further, in the PCT curves for the alloys of the present invention at −20° C., the hydrogen desorption pressure $P_{b2}$ at 0.8 wt % $H_2$ is preferably 0.05 MPa or higher, and more preferably 0.10 MPa or higher. Such alloys possess more favorable hydrogen desorption properties in a temperature range of −20 to 0° ° C. Though there is no particular upper limit in $P_{b2}$, the upper limit is practically about 4.00 MPa at −20° C.

It is particularly preferable that the invented alloys which form the invented hydrogen storage materials satisfy the above-mentioned relationships related with PCT curves, but it is also permissible that the invented alloys do not partially satisfy the above-mentioned relationships.

Next, a method for producing the hydrogen storage materials of the present invention will be described. First, examples of the method for preparing the alloys include strip casting methods such as a single roll method, a twin roll method, and a disk method, and a permanent mold casting method.

For example, in the strip casting method, raw materials blended so that the casted alloys will has a desired composition are prepared. The blended raw materials are then melted by heating in an inert gas atmosphere such as Ar to obtain a molten alloy, and the molten alloy is poured on a water-cooled copper roll, rapidly cooled and solidified, thereby alloy flakes are obtained. In the case of permanent mold casting method, a molten alloy is obtained in the same manner as mentioned above, and then the molten alloy is poured into a water-cooled copper mold to be cooled and solidified, whereby an ingot or slab is obtained. Usually, cooling rates are different between the strip casting method and the permanent mold casting method, so the strip casting method is generally more preferable than mold casting in order to obtaining alloy flakes with less segregation and uniform element distribution. Depression of segregation and uniformity of elemental distribution are very important for the invented alloys which form the invented hydrogen storage materials, therefore the strip casting method is a preferred method in the present invention as alloy production method.

Note that, in the case of strip casting methods, the preferrable cooling rate of the molten alloy for producing the alloy flakes, is as follows. The cooling rate from a temperature at which the cooling of the molten alloy begins (for example, a temperature at the time when the molten metal came in contact with the cooling roll) until the alloy temperature reaches 1000° C. is set to be 300° C./sec or higher. The cooling rate is preferably 700° C./sec or higher, more preferably 1000° C./sec or higher, and particularly preferably 4000° C./sec or higher. Though there is no particular upper limit for the cooling rate, the upper limit is practically about 20000° C./sec or lower. The beginning temperature of cooling of the molten alloy is usually within about 1300 to 1500° C., though the temperature varies depending on the composition of the alloy.

The cooling rate at less than 1000° C. is not particularly limited, and for example, in a case of the strip casting method, after being detached from the roll, the alloy flakes may be leaved to cool, and collected at a temperature of, for example, 100° C. or lower.

Furthermore, in order to obtain alloys having a more uniform composition distribution, the alloy flakes obtained by the cooling may be subjected to a heat treatment. The heat treatment can be performed in a range of 700° C. or higher and 1200° C. or lower in an inert gas atmosphere such as Ar. The heat treatment temperature is preferably 950° C. or higher and 1150° C. or lower, and the heat treatment time is 1 hour or more and less than 24 hours and preferably 3 hours or more and less than 15 hours.

Next, the alloy flakes obtained by the casting is ground in order to obtain alloy powder. The grinding can be performed by using a known grinder. Average particle size of the alloy powder is preferably 1000 μm or smaller, and more preferably 500 μm or smaller. Though it is not necessary to specifically define the smaller limit of the particle size of the alloy powder, the smaller limit is practically about 0.1 μm. Here, the particle size of the alloy powder refers to a diameter measured by a sieve shaker (Ro-Tap).

The hydrogen storage materials of the present invention may be such alloy powder itself, a composite obtained by mixing the alloy powder with a resin or the like and molding the mixture into an arbitrary form such as a granular form, or articles attached on temperature-controllable apparatus. In this case, the resin functions as a binder for the alloy powder. The mixing can be performed by a known method. For example, the mixing can be performed using a mortar, or using a rotary mixer such as a double cone rotary mixer or a V-type rotary mixer, a stirring mixer such as a blade-type stirring mixer or a screw-type stirring mixer, or the like. It is also possible to perform the mixing while grinding the alloy flakes and the binder using a grinder such as a ball mill or an attritor mill.

Hydrogen storage containers of the present invention contain the hydrogen storage materials disclosed above, and as for the materials and shapes of the containers, a known materials and a known shape can be used.

Hydrogen supply apparatuses of the present invention include the hydrogen storage container, and as for the configurations other than the container with the invented hydrogen storage materials, known configurations can be used.

EXAMPLES

Hereinafter, the present invention will be described in detail with reference to Examples and Comparative Examples, but the present invention is not limited thereto. In the descriptions of Examples, the alloys of the present invention in Examples, and the alloys in Comparative Examples that are not the alloys of the present invention, are all referred to as an "alloy" or "alloys". In addition, an alloy obtained in shape of flakes by the strip casting method is referred to as alloy flakes, and a product obtained by grinding the alloy flakes is referred to as alloy powder.

Example 1

Raw materials were weighed so that an elemental composition of an alloy to be finally obtained became the composition shown in Table 1 and melted in a high frequency melting furnace in an argon gas (Ar) atmosphere, thereby molten alloy was prepared. The molten alloy was rapidly cooled and solidified by a strip casting method. The molten alloy was poured at a temperature of 1500° C. on a water-cooled copper roll in strip-cast apparatus, and alloy flakes with an average thickness of about 0.3 mm were obtained. A temperature at which the cooling of the molten alloy began, that is, when the molten alloy came into contact with the water-cooled copper roll, was about 1450° C. A difference existed in the cooling rate of the molten alloy between the contact side and the non-contact side with the roll of the molten alloy, and the cooling rate at from 1450° C. to 1000° C. was between 6000° C./sec and 9000° C./sec.

The alloy flakes obtained above were subjected to heat treatment by being kept it in an Ar atmosphere at 1030° C. for 10 hours by using a heat treatment furnace. The heat-treated alloy flakes were embedded in an epoxy resin, the resin was cured and subjected to being cut and precision polishing using a wet polishing machine, and finally the polished surface was mirror finished, thereby forming a cross section of the alloy. Then the cross section of the alloy was etched with a 0.1 M nitric acid aqueous solution. The average grain size of crystal in the alloy was obtained by using a polarization microscope (manufactured by Olympus Corporation) with the above-described method. In this alloy, the average grain size was 93 μm.

After the heat treatment, the heat-treated alloy flakes were ground by using a stainless-steel mortar, and then alloy powder with a particle size of under 500 μm was obtained using a sieve having an opening size of 500 μm.

PCT curves of the alloy powder were obtained by using an automatic high pressure Sieverts apparatus for PCT measurement (manufactured by Fuse Technonet Co., LTD.). Prior to the measurement, the measurement tube with alloy powder was vacuumed at 80° C. for 1 hour, and then the hydrogen pressure was increased to about 2.5 MPa, and finally hydrogen was absorbed into the alloy powder until the hydrogen pressure was stabilized at −20° C. Subsequently, vacuuming was performed at 80° C. for 0.5 hours, and then the hydrogen pressure was increased to about 2.5 MPa, and finally hydrogen was absorbed into the alloy powder until the hydrogen pressure was stabilized at −20° C., and these series of operations were performed twice for activation. Next, after vacuuming at 80° C., the equilibrium pressures of hydrogen absorption and desorption (hydrogen absorption pressure and hydrogen desorption pressure) were measured by changing the hydrogen pressure between 0.01 MPa to 2.0 MPa at −20° C. The obtained hydrogen pressure-composition isotherms (PCT curves) are shown in FIG. 1.

From the desorption curve of the obtained PCT curve, the available hydrogen amount, which is the difference between the hydrogen amount at 2.0 MPa and the hydrogen amount at 0.1 MPa, and the hydrogen desorption pressure at 0.8 wt % $H_2$ were read. The results are shown in Table 1.

The squareness of the PCT curve of hydrogen desorption for the alloy powder was calculated by using equation $\{\ln(P_{a1})-\ln(P_{a2})\}/0.2$. Where $P_{a1}$ is desorption pressure at 0.3 wt % $H_2$ and Paz at 0.1 wt % $H_2$, respectively, obtained from the PCT curve. The results are shown in Table 1.

The plateau flatness in the PCT curve of hydrogen desorption for the alloy powder was calculated by using equation $\{\ln(P_{a3})-\ln(P_{a1})\}/0.8$. Where $P_{a1}$ is desorption pressure at 0.3 wt % $H_2$ and $P_{a3}$ at 1.1 wt % $H_2$, respectively obtained from the PCT curve. The results are shown in Table 1.

The hysteresis of the PCT curves for the alloy powder was calculated by using equation $\ln(P_{b1}/P_{b2})$. Where $P_{b1}$ is absorption pressure at 0.8 wt % $H_2$ for absorption curve, and $P_{b2}$ is desorption pressure at 0.8 wt % $H_2$ for desorption curve, respectively, obtained from the PCT curves. The results are shown in Table 1.

Examples 2 to 8, and 10 to 23

Alloy flakes and alloy powder of each Examples were prepared in the same manner as in Example 1, except that the elemental composition of the finally obtained alloy was changed to those shown in Table 1. Then the hydrogen absorption and desorption properties (squareness and the like) were measured. During alloys preparation pouring temperatures, temperatures at which the cooling began, and cooling rates of molten alloys of these Examples were 1500° C., 1450° C., and between 6000° C./sec and 9000° C./sec, respectively, all of which were approximately the same as those in Example 1. In this regard, the equilibrium pressures (hydrogen absorption pressure and hydrogen desorption pressure) were measured by changing the hydrogen pressure between 0.01 MPa to 3.0 MPa in Examples 11, 17 and 18 and between 0.01 MPa to 4.0 MPa in Example 12. As in Example 1, the available hydrogen amounts in Examples 2 to 8, 10, 13 to 16 and 23 were each taken as the difference between the hydrogen amount at hydrogen desorption pressure of 2.0 MPa and the hydrogen amount at hydrogen desorption pressure of 0.1 MPa. The available hydrogen amounts in Examples 11, 17 and 18 were each taken as the difference between the hydrogen amount at hydrogen desorption pressure of 3.0 MPa and the hydrogen amount at hydrogen desorption pressure of 0.1 MPa. The available hydrogen amount in Example 12 was taken as the difference between the hydrogen amount at hydrogen desorption pressure of 4.0 MPa and the hydrogen amount at hydrogen desorption pressure of 0.1 MPa. The available hydrogen amounts in Examples 19 to 22 were each taken as the difference between the hydrogen amount at hydrogen desorption pressure of 2.0 MPa and the hydrogen amount at hydrogen desorption pressure of 0.01 MPa. The results of various measured values are shown in Table 1.

Example 9

Alloy flakes and alloy powder were prepared in the same manner as in Example 2, except that the heat treatment after alloy casting was not performed, and the hydrogen absorption and desorption properties (squareness and the like) were measured. During the alloy preparation pouring temperature, temperature at which the cooling began, and cooling rate of molten alloys in Example 9 were 1500° C., 1450° C., and between 6000° C./sec and 9000° C./sec, respectively, which were approximately the same as those in Example 1. The results of various measured values are shown in Table 1.

Comparative Examples 1 to 5

Figure 2:
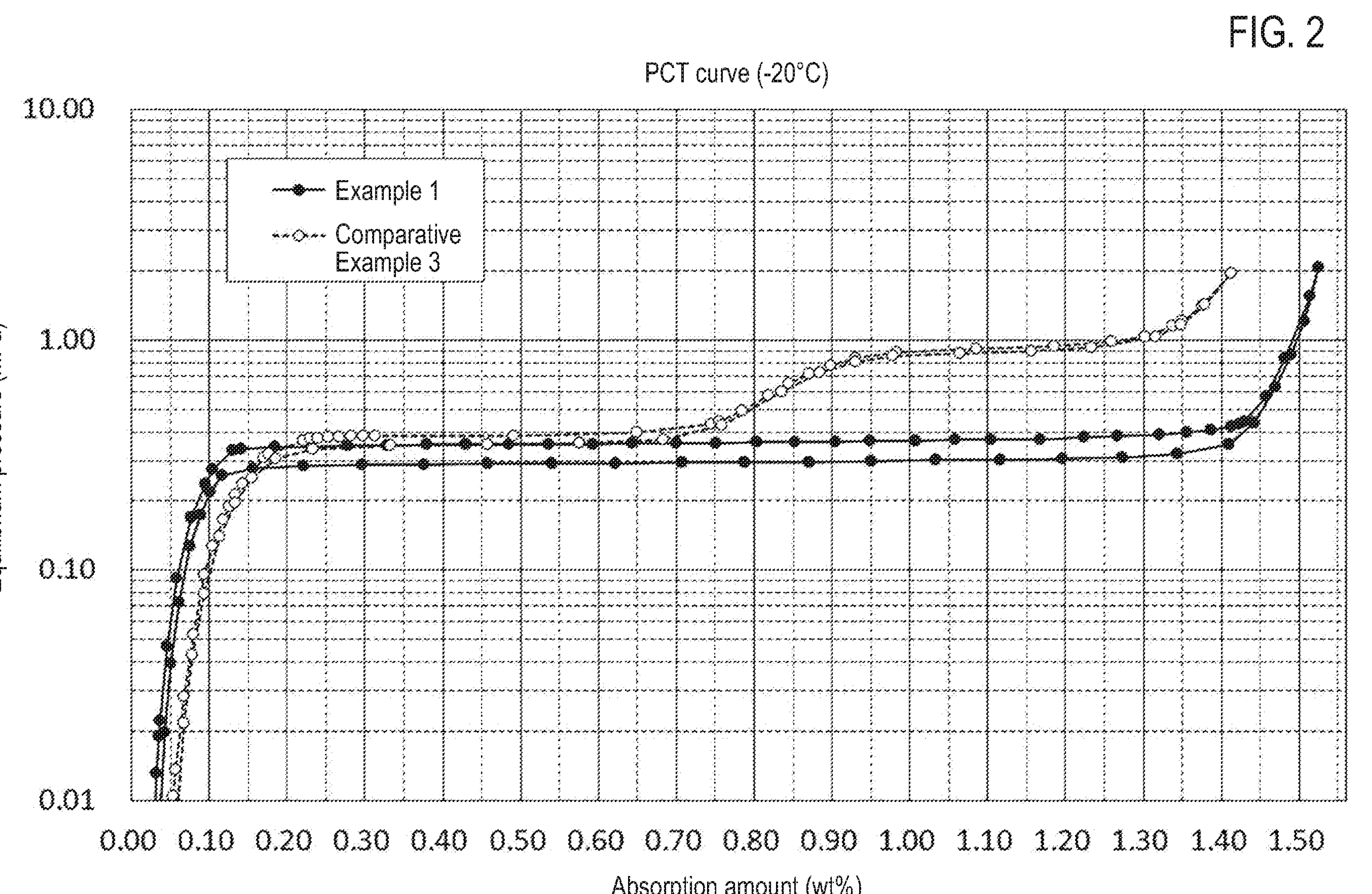
FIG. 2 shows hydrogen pressure-composition isotherms (PCT curves) of the alloy powder in Example 1 and the alloy powder in Comparative Example 3, measured at −20° C. The y-axis indicates the hydrogen absorption pressure during hydrogen absorption and the hydrogen desorption pressure during hydrogen desorption.

Alloy flakes and alloy powder of each Comparative Examples were prepared in the same manner as in Example 1, except that the elemental composition of the finally obtained alloy was changed to those shown in Table 1. Then the hydrogen absorption and desorption properties (squareness and the like) were measured. During alloys preparation pouring temperatures, temperatures at which the cooling began, and cooling rates of molten alloys of these Comparative Examples were 1500° C., 1450° C., and between 6000° C./sec and 9000° C./sec, respectively, all of which were approximately the same as those in Example 1. The results of various measured values are shown in Table 1. In Comparative Example 2, since the hydrogen absorption amount did not reach 1.1 wt % at the time of the PCT curve measurement, the plateau flatness could not be calculated. The hydrogen pressure-composition isotherms (PCT curves) of Comparative Example 1 are shown in FIG. 1. Further, the hydrogen pressure-composition isotherms (PCT curves) of Comparative Example 3 are shown in FIG. 2.

TABLE 1

| | Composition (atomic ratio) | | | | | | | | | |
|---|---|---|---|---|---|---|---|---|---|---|
| | a | b | c | d | e | | | | | Heat |
| | La | Ce | Sm | Ni | Mn | Co | Al | c + e | d + e | treatment |
| Example 1 | 0.35 | 0.35 | 0.30 | 4.72 | 0.16 | 0.36 | | 0.82 | 5.24 | 1030° C. × 10 h |
| Example 2 | 0.30 | 0.38 | 0.32 | 4.72 | 0.16 | 0.36 | | 0.84 | 5.24 | 1030° C. × 10 h |
| Example 3 | 0.25 | 0.40 | 0.35 | 4.72 | 0.16 | 0.36 | | 0.87 | 5.24 | 1030° C. × 10 h |
| Example 4 | 0.35 | 0.35 | 0.30 | 4.82 | 0.06 | 0.36 | | 0.72 | 5.24 | 1030° C. × 10 h |
| Example 5 | 0.35 | 0.35 | 0.30 | 4.92 | 0.06 | 0.36 | | 0.72 | 5.34 | 1030° C. × 10 h |
| Example 6 | 0.35 | 0.25 | 0.40 | 5.12 | 0.21 | 0.00 | | 0.61 | 5.33 | 1030° C. × 10 h |
| Example 7 | 0.25 | 0.22 | 0.53 | 5.02 | 0.21 | 0.00 | | 0.74 | 5.23 | 1030° C. × 10 h |
| Example 8 | 0.35 | 0.25 | 0.40 | 5.02 | 0.21 | 0.00 | | 0.61 | 5.23 | 1030° C. × 10 h |
| Example 9 | 0.30 | 0.38 | 0.32 | 4.72 | 0.16 | 0.36 | | 0.84 | 5.24 | None |
| Example 10 | 0.15 | 0.46 | 0.39 | 4.72 | 0.16 | 0.36 | | 0.91 | 5.24 | 1030° C. × 10 h |
| Example 11 | 0.05 | 0.51 | 0.44 | 4.72 | 0.16 | 0.36 | | 0.96 | 5.24 | 1030° C. × 10 h |
| Example 12 | 0.00 | 0.54 | 0.46 | 4.57 | 0.16 | 0.51 | | 1.13 | 5.24 | 1030° C. × 10 h |
| Example 13 | 0.35 | 0.35 | 0.30 | 4.59 | 0.11 | 0.54 | | 0.95 | 5.24 | 1030° C. × 10 h |
| Example 14 | 0.35 | 0.35 | 0.30 | 4.74 | 0.19 | 0.36 | | 0.85 | 5.29 | 1030° C. × 10 h |
| Example 15 | 0.35 | 0.35 | 0.30 | 4.71 | 0.22 | 0.36 | | 0.88 | 5.29 | 1030° C. × 10 h |
| Example 16 | 0.35 | 0.35 | 0.30 | 4.72 | 0.20 | 0.36 | | 0.86 | 5.28 | 1030° C. × 10 h |
| Example 17 | 0.10 | 0.38 | 0.52 | 4.69 | 0.19 | 0.36 | | 1.07 | 5.24 | 1030° C. × 10 h |
| Example 18 | 0.10 | 0.38 | 0.52 | 4.67 | 0.21 | 0.36 | | 1.09 | 5.24 | 1030° C. × 10 h |
| Example 19 | 0.50 | 0.27 | 0.23 | 4.72 | 0.16 | 0.36 | | 0.75 | 5.24 | 1030° C. × 10 h |
| Example 20 | 0.50 | 0.27 | 0.23 | 4.70 | 0.18 | 0.36 | | 0.77 | 5.24 | 1030° C. × 10 h |
| Example 21 | 0.60 | 0.22 | 0.18 | 4.72 | 0.16 | 0.36 | | 0.70 | 5.24 | 1030° C. × 10 h |
| Example 22 | 0.60 | 0.22 | 0.18 | 4.67 | 0.21 | 0.36 | | 0.75 | 5.24 | 1030° C. × 10 h |
| Example 23 | 0.35 | 0.35 | 0.30 | 4.72 | 0.11 | 0.36 | 0.05 | 0.82 | 5.24 | 1030° C. × 10 h |
| Comparative Example 1 | 0.35 | 0.35 | 0.30 | 5.02 | 0.21 | 0.00 | | 0.51 | 5.23 | 1030° C. × 10 h |

TABLE 1-continued

| | | | | | | | | | |
|---|---|---|---|---|---|---|---|---|---|
| Comparative Example 2 | 0.35 | 0.35 | 0.30 | 5.17 | 0.06 | 0.00 | | 0.36 | 5.23 | 1030° C. × 10 h |
| Comparative Example 3 | 0.35 | 0.35 | 0.30 | 4.92 | 0.16 | 0.36 | | 0.82 | 5.44 | 1030° C. × 10 h |
| Comparative Example 4 | 0.35 | 0.35 | 0.30 | 5.02 | 0.06 | 0.36 | | 0.72 | 5.44 | 1030° C. × 10 h |
| Comparative Example 5 | 0.35 | 0.35 | 0.30 | 4.57 | 0.16 | 0.71 | | 1.17 | 5.44 | 1030° C. × 10 h |

| | Available hydrogen amount (wt %) | Hydrogen desorption pressure (MPa) at 0.8 wt % | Squareness | Plateau flatness | Hysteresis | Crystal grain size (μm) |
|---|---|---|---|---|---|---|
| Example 1 | 1.45 | 0.30 | 1.50 | 0.04 | 0.18 | 93 |
| Example 2 | 1.45 | 0.36 | 1.03 | 0.07 | 0.20 | 89 |
| Example 3 | 1.46 | 0.47 | 1.17 | 0.07 | 0.24 | 104 |
| Example 4 | 1.47 | 0.48 | 0.45 | 0.07 | 0.35 | 95 |
| Example 5 | 1.40 | 0.71 | 1.28 | 0.09 | 0.23 | 90 |
| Example 6 | 1.41 | 0.30 | 0.98 | 0.13 | 0.26 | 85 |
| Example 7 | 1.41 | 0.29 | 0.57 | 0.07 | 0.35 | 96 |
| Example 8 | 1.44 | 0.20 | 0.42 | 0.10 | 0.43 | 102 |
| Example 9 | 1.43 | 0.33 | 1.41 | 0.15 | 0.23 | 49 |
| Example 10 | 1.43 | 0.62 | 1.72 | 0.13 | 0.38 | 62 |
| Example 11 | 1.41 | 1.00 | 1.32 | 0.11 | 0.51 | 56 |
| Example 12 | 1.34 | 1.35 | 1.72 | 0.19 | 0.55 | 51 |
| Example 13 | 1.46 | 0.35 | 1.26 | 0.42 | 0.20 | 85 |
| Example 14 | 1.42 | 0.31 | 2.70 | 0.08 | 0.15 | 94 |
| Example 15 | 1.42 | 0.22 | 3.83 | 0.08 | 0.15 | 80 |
| Example 16 | 1.44 | 0.25 | 2.96 | 0.10 | 0.15 | 84 |
| Example 17 | 1.43 | 0.71 | 1.52 | 0.21 | 0.19 | 87 |
| Example 18 | 1.43 | 0.58 | 1.50 | 0.18 | 0.19 | 87 |
| Example 19 | 1.50 | 0.12 | 1.00 | 0.04 | 0.22 | 84 |
| Example 20 | 1.52 | 0.10 | 0.37 | 0.06 | 0.26 | 98 |
| Example 21 | 1.52 | 0.07 | 0.39 | 0.07 | 0.27 | 103 |
| Example 22 | 1.50 | 0.05 | 0.99 | 0.07 | 0.26 | 106 |
| Example 23 | 1.42 | 0.33 | 3.38 | 0.15 | 0.13 | 97 |
| Comparative Example 1 | 1.45 | 0.15 | 0.57 | 0.13 | 0.79 | 95 |
| Comparative Example 2 | 0.82 | 0.50 | 0.50 | — | 0.88 | 97 |
| Comparative Example 3 | 1.31 | 0.51 | 6.12 | 1.19 | 0.03 | 82 |
| Comparative Example 4 | 1.38 | 0.56 | 4.48 | 0.29 | 0.13 | 85 |
| Comparative Example 5 | 1.28 | 0.80 | 2.91 | 0.09 | 0.56 | 78 |

As is clear from the table, the alloy of each Example has favorable squareness of the PCT curve and shows a sufficient available hydrogen amount, compared to the alloy of each Comparative Example. Further, since the hydrogen desorption pressures at 0.8 wt % $H_2$ are all 0.05 MPa or higher, hydrogen can be sufficiently absorbed and desorbed in a temperature range of 0° C. or lower. Moreover, hydrogen storage materials with small hysteresis in PCT curves are presented.

What is claimed is:

1. A hydrogen storage material, comprising:
an alloy having a composition represented by the following Formula (1),

[Formula (1)]

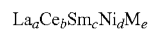 (1)

wherein in Formula (1),
M comprises:
Mn; and
optionally, at least one of Co and Al,
a satisfies 0.00≤a≤0.62,
b satisfies 0.20≤b≤0.57,
c satisfies 0.17≤c≤0.60,
d satisfies 4.50≤d≤5.20,
e satisfies 0.15≤e≤0.70,
a+b+c=1,
c+e satisfies 0.55≤c+e≤1.20, and
d+e satisfies 5.13≤d+e≤5.40.

2. The hydrogen storage material according to claim 1, wherein M is Mn or both of Mn and Co, a satisfies 0.00≤a≤0.40, and c satisfies 0.20≤c≤0.60 in Formula (1).

3. A hydrogen storage container, containing:
the hydrogen storage material according to claim 2.

4. A hydrogen supply apparatus, comprising:
the hydrogen storage container according to claim 3.

5. The hydrogen storage material according to claim 2, the alloy satisfying a relational expression of [{ln($P_{a1}$)-ln($P_{a2}$)}/0.2]≤4.20: wherein, $P_{a1}$ is desorption pressure at a hydrogen amount of 0.3 wt %, and $P_{a2}$ is desorption pressure at a hydrogen amount of 0.1 wt % in a hydrogen pressure-composition isotherm for the alloy at −20° C.

6. The hydrogen storage material according to claim 5, wherein the $P_{a1}$ and the $P_{a2}$ satisfy a relational expression of [{ln($P_{a1}$)-ln($P_{a2}$)}/0.2]≤2.00.

7. A hydrogen storage container, containing: the hydrogen storage material according to claim 6.

8. A hydrogen supply apparatus, comprising: the hydrogen storage container according to claim 7.

9. A hydrogen storage container, containing: the hydrogen storage material according to claim 1.

10. A hydrogen supply apparatus, comprising: the hydrogen storage container according to claim 9.

11. The hydrogen storage material according to claim 1, the alloy satisfying a relational expression of $[\{\ln(P_{a1})-\ln(P_{a2})\}/0.2]\leq 4.20$: wherein, $P_{a1}$ is desorption pressure at a hydrogen amount of 0.3 wt %, and $P_{a2}$ is desorption pressure at a hydrogen amount of 0.1 wt % in a hydrogen pressure-composition isotherm for the alloy at −20° C.

12. A hydrogen storage container, containing: the hydrogen storage material according to claim 11.

13. A hydrogen supply apparatus, comprising: the hydrogen storage container according to claim 12.

14. The hydrogen storage material according to claim 11, wherein the $P_{a1}$ and the $P_{a2}$ satisfy a relational expression of $[\{\ln(P_{a1})-\ln(P_{a2})\}/0.2]\leq 2.00$.

15. A hydrogen storage container, containing: the hydrogen storage material according to claim 14.

16. A hydrogen supply apparatus, comprising: the hydrogen storage container according to claim 15.

* * * * *